US012638170B2

(12) United States Patent
Carty

(10) Patent No.: US 12,638,170 B2
(45) Date of Patent: May 26, 2026

(54) LATCH-ASSIST TOOL

(71) Applicant: JLC THREE SIXTY LLC, Rancho Santa Fe, CA (US)

(72) Inventor: Julie Lopez Carty, Rancho Santa Fe, CA (US)

(73) Assignee: JLC THREE SIXTY LLC

( * ) Notice: Subject to any disclaimer, the term of this patent is extended or adjusted under 35 U.S.C. 154(b) by 397 days.

(21) Appl. No.: 18/180,269

(22) Filed: Mar. 8, 2023

(65) Prior Publication Data

US 2023/0287913 A1 Sep. 14, 2023

Related U.S. Application Data

(60) Provisional application No. 63/269,057, filed on Mar. 9, 2022.

(51) Int. Cl.
*F21V 33/00* (2006.01)
*F21S 9/02* (2006.01)

(52) U.S. Cl.
CPC ............. *F21V 33/0004* (2013.01); *F21S 9/02* (2013.01)

(58) Field of Classification Search
CPC ...... Y10S 211/01; A61J 7/0023; A61B 13/00; A61B 1/24; A61B 1/247; A61B 1/253; A61B 1/0623; F21V 21/0965; F21V 33/0004; F21S 9/02
See application file for complete search history.

(56) References Cited

U.S. PATENT DOCUMENTS 361,248 A * 4/1887 Winton ................. H01F 7/0252 211/DIG. 1
3,370,163 A * 2/1968 Brill .......................... F21L 2/00 362/119
3,839,793 A * 10/1974 Crapio ................... A47G 21/02 D7/657
3,890,960 A 6/1975 Wunsch et al.
4,210,953 A * 7/1980 Stone ........................ F21L 2/00 362/205
4,807,599 A 2/1989 Robinson et al.
5,023,761 A * 6/1991 de Lange ............ A47J 37/0786 362/120

(Continued)

FOREIGN PATENT DOCUMENTS

DE 8128431 U1 4/1982
EP 2258255 A1 12/2010

OTHER PUBLICATIONS

International Search Report and Written Opinion of the International Searching Authority mailed Jun. 23, 2023 for International Application No. PCT/US2023/063934, 13 pages.

*Primary Examiner* — Zheng Song
*Assistant Examiner* — James M Endo
(74) *Attorney, Agent, or Firm* — Stetina Garred Brucker & Newboles

(57) ABSTRACT

Devices and methods for assisting a mother to ensure correct latching of an infant onto the breast or bottle during feeding. A latch-assist tool may include a hands-free warm, soft light that can be directed towards the baby's mouth so as to provide light for the mother to see to help with successful feeding, along with a spatula-like tip designed to help flange the baby's lips out for proper latch positioning. Optionally, the latch-assist tool can be used with a magnetic storage device and/or a magnetic holder that may also serve as a breast-feeding reminder clip.

20 Claims, 7 Drawing Sheets

(56) References Cited

U.S. PATENT DOCUMENTS

| | | | | |
|---|---|---|---|---|
| 5,092,812 | A | 3/1992 | Babcock | |
| 5,163,566 | A * | 11/1992 | Hempel | A47K 1/09 211/DIG. 1 |
| 5,598,926 | A * | 2/1997 | Vogt | G08B 3/1058 24/3.9 |
| 6,179,431 | B1 * | 1/2001 | Chien | F21L 4/02 362/802 |
| 6,257,734 | B1 * | 7/2001 | Tchira | F21L 27/00 429/57 |
| 6,264,529 | B1 | 7/2001 | Logue | |
| 6,364,739 | B1 | 4/2002 | Dutka et al. | |
| 6,622,349 | B2 | 9/2003 | Wong | |
| 8,061,068 | B1 | 11/2011 | Donovan | |
| 8,640,266 | B2 | 2/2014 | Best et al. | |
| 9,565,879 | B2 | 2/2017 | Lahann | |
| 10,143,630 | B2 | 12/2018 | Yang et al. | |
| 10,426,207 | B2 | 10/2019 | Dorros | |
| 10,537,141 | B2 | 1/2020 | Akerson et al. | |
| 2003/0058637 | A1 * | 3/2003 | Hsien | F21V 21/0965 362/187 |
| 2003/0097759 | A1 * | 5/2003 | Bond | A47J 43/288 30/340 |
| 2004/0023184 | A1 | 2/2004 | De Josselin De Jong et al. | |
| 2004/0156268 | A1 | 8/2004 | Hall | |
| 2004/0237262 | A1 * | 12/2004 | Arnone | B43K 25/00 24/10 R |
| 2007/0119810 | A1 | 5/2007 | Boles | |
| 2010/0164239 | A1 * | 7/2010 | Grennan | A01K 1/0114 294/1.3 |
| 2010/0269239 | A1 | 10/2010 | Kulp et al. | |
| 2011/0239470 | A1 * | 10/2011 | Hemstreet | A47G 21/02 30/327 |
| 2012/0236548 | A1 * | 9/2012 | Wilson | F21L 4/005 362/183 |
| 2014/0310961 | A1 * | 10/2014 | James | A47G 21/02 30/322 |
| 2016/0157874 | A1 | 6/2016 | Guilarte | |
| 2017/0071463 | A1 * | 3/2017 | Xiao | A61B 13/00 |
| 2018/0177285 | A1 * | 6/2018 | MacDonald | H01F 7/0252 |
| 2020/0400302 | A1 * | 12/2020 | Zhu | F21V 29/767 |

* cited by examiner

LATCH-ASSIST TOOL

CROSS-REFERENCE TO RELATED APPLICATIONS

This application claims priority and the benefits under 35 U.S.C. § 119(e) and PCT article 4 to U.S. Provisional Application No. 63/269,057 filed on Mar. 9, 2022, which is hereby incorporated herein by reference in its entirety for all purposes.

BACKGROUND

When a mother is breast- or bottle-feeding an infant, it is important to make sure that the baby is latched and positioned correctly. Incorrect positioning and latch-on during breastfeeding can result in frictional damage to the mother's nipple (including sore or cracked nipples), and can also causes inadequate stimulation to the nipple and areola of the breastfeeding mother, reducing milk removal effectiveness and efficiency. Incorrect positing and latch-on during bottle feeding can result in coughing or choking, taking in too much air causing uncomfortable gas. In addition, the baby's suck reflex is not stimulated properly and as a result he/she may not receive enough nutrients during feeding. An indicator of a baby's improper latch is lips that are curled in and not flanged outwards ("fish lips"). If the baby is latched onto the breast correctly, the mother is less likely to feel nipple pain, and the baby is likely to get more milk as the baby compresses the areola beneath which the reservoirs for milk are located. During breastfeeding, mothers have an impeded view of the lower part of the breast that contacts the baby's lower jaw and tongue. However, this area is critical for correct latch-on. Therefore, the occurrence of incorrect latch-on is common, which has a negative impact on breast feeding.

Furthermore, infant feeding sessions often need to occur at night when it is dark. Lack of light can make it even more difficult for the mother to see whether the baby is correctly latched. However, turning on room lights, whether overhead lights or smaller lamps, can disrupt sleep (and/or return to sleep) for the baby and the mother, as well as others who may be in the room. This is due not only the brightness of the light, but also the Kelvin color of the light. Using a handheld light source, such as a cell-phone light, for example, may be difficult and too bright for the mother to accomplish while also holding and correctly positioning the baby at the same time.

SUMMARY

Aspects and embodiments of the technology disclosed herein pertain to a lighting and latch-assist device designed to help a mother successfully breast and/or bottle feed without unduly disturbing the baby and/or other people who may be in the same room with the mother and infant. As discussed in more detail below, embodiments of the device include a soft-light flashlight that can be used hands-free and that has a spatula-like tip designed to help flange a baby's lips out for proper latch positioning once the baby's jaw and mouth are in the proper position on the breast and/or bottle.

According to one embodiment, a latch-assist tool, which may be used for breastfeeding and/or bottle-feeding, includes a body having a flattened tip at one end, the tip being configured to be used to flange open an infant's lips, a light source accommodated in the body and positioned between the tip and an opposite end of the body, the light source configured to emit light, a power source accommodated in the body, the power source configured to supply operating power to the light source, and a power button accommodated in the body and electrically connected to the power source, the power button being configured to activate and deactivate the light source.

Various implementations of the latch-assist tool may include any one or more of the following features.

In one example, the light source is a light emitting diode (LED) light source. In certain examples, the light source is a low temperature on Kelvin scale (e.g., 2700-3300 Kelvin), blue reduced LED light source.

In one example, the power button is positioned proximate the opposite end of the body. The power source may be a battery, for example. In one example, the battery is rechargeable. The power button may be a press button or a switch, for example.

The latch-assist tool may further include a magnet accommodated in the body. In certain examples, the magnet is positioned proximate the opposite end of the body on an opposing side of the body from the power button.

In one example, the body is made of a BPA-free plastic, such as the Tritan™ copolymer, for example. In some examples, the body is made of a soft/smooth, rigid plastic. In other examples, the body is made of a silicone material.

In another example, the tip has the form of a spatula.

In another example, the body includes a luminescent (e.g., glow-in-dark) pigment.

According to another embodiment, an infant feeding-assist system includes a latch-assist tool as discussed above, and a magnetic holder configured to be attached to an item of clothing and including at least one holder magnet, wherein the breastfeeding tool is configured to be magnetically attached to the magnetic holder via magnetic engagement between the magnet and the at least one holder magnet.

In one example, the magnetic holder includes a strip of cloth, with the holder magnet being embedded in the strip of cloth. In another example, the magnetic holder includes two magnets imbedded in a silicon material. In one example, the silicone material includes a luminescent (e.g., glow-in-dark) pigment. In certain examples, the magnetic holder includes a mating pair of fasteners to attach the magnetic holder to the item of clothing. In one example, the mating pair of fasteners includes the holder magnet and an additional magnet that magnetically clip together to attach the magnetic holder to the item of clothing. In other examples, the mating pair of fasteners includes any one of hook and loop fasteners, snap fasteners, and magnetic fasteners.

According to another embodiment, a latch-assist tool includes a body having a flattened tip at one end, the tip being formed with a flattened spatula shape, a light source accommodated in the body and positioned between the tip and an opposite end of the body, the light source configured to emit light, a battery configured to supply operating power to the light source, and a power button accommodated in the body and electrically connected to the battery, the power button being configured to activate and deactivate the light source.

In one example, the latch-assist tool further includes a magnet accommodated in the body for magnetically attaching the latch-assist tool to a magnetic holder.

In another example, the body is made of a luminescent plastic. In certain examples, the plastic includes a luminescent pigment.

According to another embodiment, a latch-assist kit comprises a latch-assist tool and a magnetic holder. The latch-assist tool includes a body having a flattened tip at one end, a light source accommodated in the body and positioned between the tip and an opposite end of the body, the light source configured to emit light towards the tip, a battery accommodated in the body and configured to supply operating power to the light source, a power button accommodated in the body and electrically connected to the battery, the power button being configured to activate and deactivate the light source, and a magnet accommodated in the body. The magnetic holder is configured to be attached to an item of clothing and includes at least one holder magnet. The latch-assist tool is configured to be magnetically attached to the magnetic holder via magnetic engagement between the magnet and the at least one holder magnet.

In one example, the magnetic holder comprises a silicone material. The holder magnet may be embedded in the silicone material. In another example, the magnetic holder includes a strip of cloth, with the holder magnet being embedded in or attached to the strip of cloth.

In one example, the magnetic holder includes a mating pair of fasteners to attach the magnetic holder to the item of clothing.

The magnetic holder may include a luminescent pigment.

In one example, the body of the latch-assist tool is made of silicone. The body may include a luminescent pigment.

In another example, the latch-assist kit further comprises a magnetic storage device including a housing and at least one storage magnet accommodated in the housing, wherein the latch-assist tool is configured to be magnetically attached to the magnetic storage device via magnetic engagement between the magnet and the at least one storage magnet. In one example, wherein the housing of the magnetic storage device includes a luminescent pigment.

Another embodiment is directed to a latch-assist tool for use in assisting feeding of an infant, the latch-assist tool comprising a body having a tip and an opposing end, the body being made of at least one of a BPA-free plastic, optionally a soft, rigid plastic, or silicone, and the body including a luminescent pigment, a light source accommodated in the body and positioned along a length of the body between the tip and the opposing end of the body, the light source configured to emit light towards the tip, at least one battery accommodated in the body and configured to supply operating power to the light source, and a power button accommodated in the body and electrically connected to the at least one battery, the power button being configured to activate and deactivate the light source.

According to one embodiment, a latch-assist tool, which may be used for breastfeeding and/or bottle-feeding, includes a body having a flattened tip at one end, the tip being configured to be used to flange open an infant's lips, and a light source configured to emit a warm, soft light, the light source being arranged to emit the light in a direction of the tip. The light source may be a low temperature on Kelvin scale (e.g., 2700-3300 Kelvin), blue-reduced, or warm, amber LED light source, for example. The light source may be accommodated in the body, or may be attached to the body, for example, using a clip or other attachment mechanism. The tip may have a rounded end and be configured to flare outwardly from the end of the body to form an arc or fan shape.

Some examples of the latch-assist tool further include a power source configured to supply operating power to the light source, and a power button configured to activate and deactivate the light source. In some examples, the power source and the power button are accommodated in the body of the latch-assist tool. In other examples, the power source and the power button are accommodated in a housing of the light source. The power source may include one or more batteries.

Still other aspects, embodiments, and advantages of these exemplary aspects and embodiments are discussed in detail below. Embodiments and implementations disclosed herein may be combined with other embodiments and implementations in any manner consistent with at least one of the principles disclosed herein.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1A:
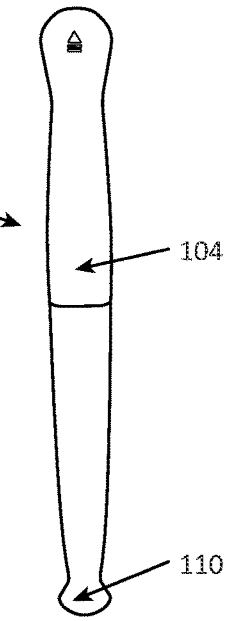
FIG. 1A is a bottom view of one example of a latch-assist tool according to aspects of the present disclosure.
Figure 1B:
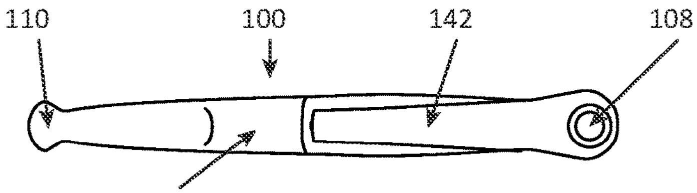
FIG. 1B is a top plan view of an example of the latch-assist tool of FIG. 1A, according to aspects of the disclosure.
Figure 1C:
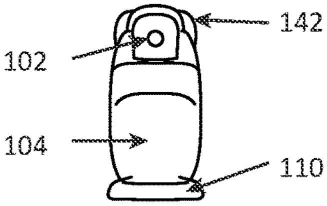
FIG. 1C is a front end view of the example of the latch-assist tool of FIGS. 1A and 1B, according to aspects of the disclosure.

Aspects and embodiments are directed to a device that is designed to help a mother successfully breast- and/or bottle-feed by providing both a latch-assisting tool that helps to ensure correct latching of the baby onto the breast and/or bottle and a soft light that helps the mother to see (for determining whether the baby is correctly latched onto the breast as well as for other tasks she may wish to perform). As discussed above, while turning on room lights may help a mother to see whether the infant is properly positioned and latched correctly, such lights typically provide far too much light and may wake up people in the room, including the baby or adult, and also make it more difficult for the mother, baby and/or others in the room to go back to sleep due to light's dramatic effects on sleep, influencing circadian rhythm, melatonin production, and sleep cycles. Further, such lights provide light generally, and do not direct the light only to where it is needed for determining correct latch-on. Cell-phone lights or other conventional flashlights are often too bright, and it can be difficult for the mother to hold and operate these lights while also positioning the baby. In contrast, aspects and embodiments of the device disclosed herein may provide a "hands-free" soft light that is not too bright and which may be directed towards the baby's mouth so as to specifically provide light for the mother to see to help with successful feeding without the disruption associated with room lights, lamps, or other bright lights. In addition, to providing soft and warm light, embodiments of the device are also configured to physically assist with achieving correct latching. Conventionally, the mother must use her fingers to try to position the baby's mouth and lips to try to ensure that the baby is correctly latched onto her breast and/or bottle. However, this can be very difficult, even with sufficient light, in part because of the size of the baby's mouth and the size and shape of the mother's fingers. For example, with the baby's tiny mouth, it can be very difficult for the mother to use her finger(s), which are relatively large (compared to the baby's mouth) and rounded in shape, to flange the baby's lips out without delatching the baby completely. As discussed in more detail below, aspects and embodiments provide a solution to this problem by providing the lighting device with a slim, flattened spatula-like tip designed to help flange the baby's lips out for proper latch positioning. Thus, embodiments of the device may provide a unique combination of light and physical latch-assist to help women successfully breastfeed.

Referring to FIGS. 1A-E, there is illustrated one example of a latch-assist tool 100 according to certain embodiments. As illustrated, the latch-assist tool 100 includes a body 104 having a flattened "spatula-like" tip 110 at one end, as discussed further below. The latch-assist tool 100 further includes a power switch or button 108, as also discussed further below. In the illustrated example, the power button 108 is positioned near one end 140 of the body 104 (the end away from a tip 110); however, in other examples the power button 108 may be positioned elsewhere on the body 104.

In examples, the latch-assist tool 100 includes a light source 102 integrated with the body 104 of the tool, as shown. In certain examples, the light source 102 is accommodated in a light source housing portion 142 of the body 104. The light source 102 emits light 106 (FIG. 2C) in a direction towards the tip 110. In other examples, rather than being integrated with the body 104, the light source 102 can be attached to the body 104, for example, using a clip or other fastening mechanism. According to certain embodiments, the light source 102 is a light emitting diode (LED) light source that includes one or more LED bulbs. The light source 102 may be a "blue-reducing" light source, also referred to as a low intensity LED, warm white LED, warm amber, and/or reduced blue LED, that emits a soft light (with minimal exposure of blue rays, or at least reduced blue exposure compared to white light) that is gentle on the eyes and designed for use at night. In certain examples, the light source is a low temperature on Kelvin scale (e.g. in a range of approximately 2700 to 3300 Kelvin), blue reduced LED light source. The LED bulb(s) may be blue-reducing filtered bulbs, or the light source 102 may include a blue-reducing filter positioned over the bulb(s) to filter the emitted light 106.

In certain embodiments, the body 104 may include finger grips 148 to help with the ergonomics of holding the latch-assist tool 100, and to help guide a user to use the tool more intuitively. In the example shown in FIGS. 1B, 1D, and 1E, the finger grips 148 are formed in the light source housing portion 142 of the body 104, but in other examples they may be positioned elsewhere.

Embodiments of the latch-assist tool 100 include a power button (or "ON/OFF" switch) 108 (also shown in FIG. 3) that turns the light source 102 on and off. In certain examples, the power button 108 may be in the form of a simple press button that the user may gently press to engage and turn the light on and off. One press of the power button 108 may turn the light source 102 on and another press may turn the light source off. In other examples, the power button 108 may include a switch, such as a rocker switch or other type of switch that the user can preferably operate easily with one hand to turn the light source 102 on and off.

Figure 5A:
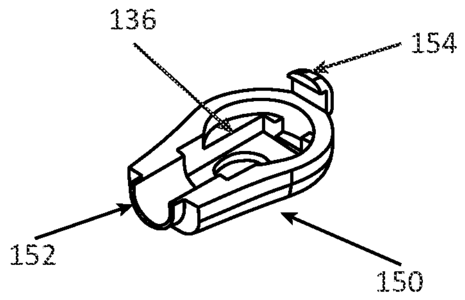
FIG. 5A is a perspective view of one example of a battery compartment cover operable with examples of the latch-assist tool of FIGS. 2A-2C, according to aspects of the disclosure.
Figure 5B:
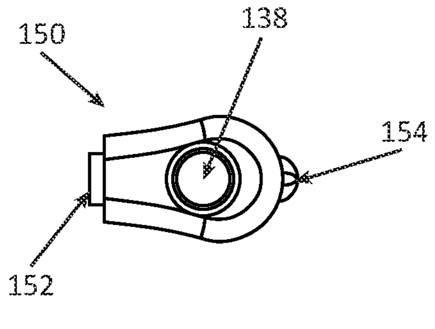
FIG. 5B is a top plan view of the battery compartment cover of FIG. 5A, according to aspects of the disclosure.
Figure 6:
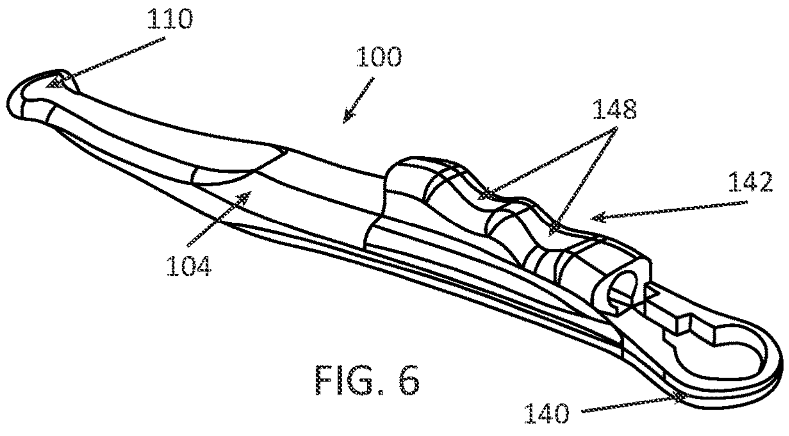
FIG. 6 is a perspective view of another example of a latch-assist tool according to aspects of the disclosure.

FIGS. 2A-C and 6 show various views of another example of a latch-assist tool 100 according to certain embodiments. Embodiments of the latch-assist tool 100 may be battery-operated, and may include a battery compartment 136 in the body 104 that houses one or more batteries 138 (see FIG. 5B) to supply power to the light source 102. In certain examples, the battery compartment is positioned at an opposing end 140 of the body 104, away from the tip 110; however, in other examples, the battery compartment 136 may be positioned elsewhere on the body 104. In the example shown in FIGS. 2A-C, and 6, the latch-assist tool 100 is shown with the battery compartment 136 open. In certain embodiments, the latch-assist tool 100 includes a battery compartment cover 150, an example of which is shown in FIGS. 5A and 5B, which clips onto the end 140 as discussed further below.

In one example, a single "coin" type battery may be used; however, in other examples, other types of batteries and/or multiple batteries, may be used. In certain examples, the battery 138 may be rechargeable. As discussed above, according to certain embodiments, the battery compartment

Figure 1D:
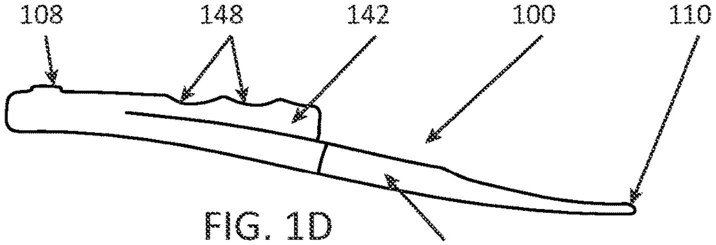
FIG. 1D is a side view of the example of the latch-assist tool of FIGS. 1A-C, according to aspects of the disclosure.
Figure 1E:
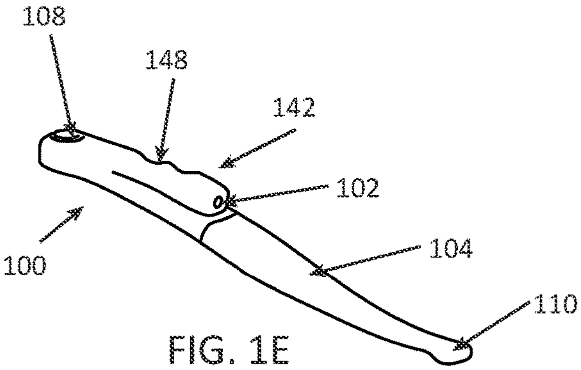
FIG. 1E is a perspective view of the example of the latch-assist tool of FIGS. 1A-D, according to aspects of the disclosure.
Figure 2A:
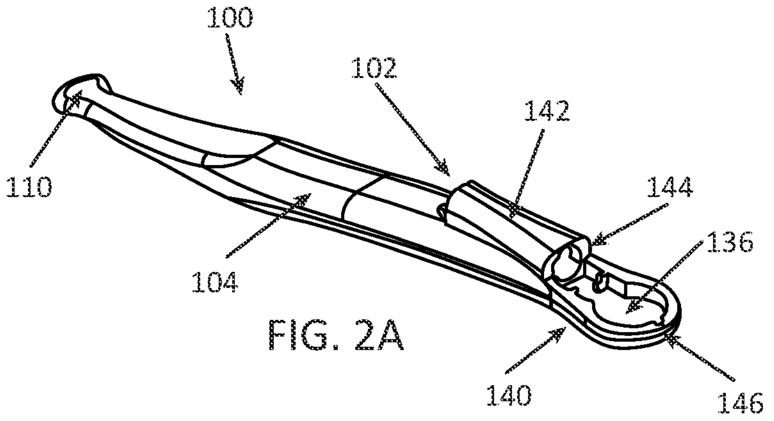
FIG. 2A is a perspective view of an example of a latch-assist tool according to aspects of the present disclosure.
Figure 2B:
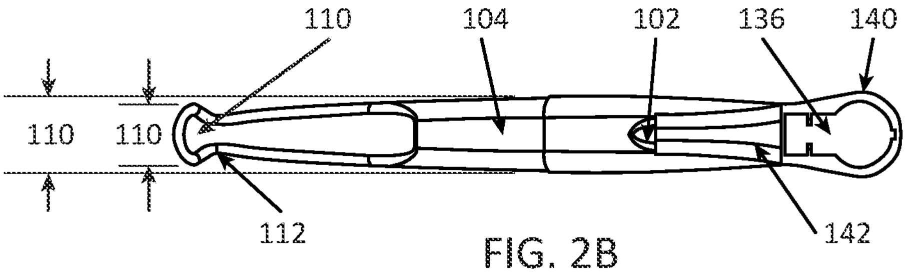
FIG. 2B is a top plan view of one example of the latch-assist tool of FIG. 2A, according to aspects of the disclosure.

136 is accommodated in the end 140 of the latch-assist tool 100, as shown in FIGS. 1, 2A and 2B, and the latch-assist tool 100 includes a battery compartment cover 150 that clips onto and over the end 140 to close the battery compartment 136 and secure the battery 138 within. FIG. 5A shows a perspective view of one example of the battery compartment cover 150, and FIG. 5B shows a plan view, illustrating an example of the battery 138 within the battery compartment 136. The battery compartment may be formed by a combination of a portion of the tool end 140 and the battery compartment cover 150. In the illustrated examples, the battery compartment 150 attaches to the end 140 of the body 104 of the latch-assist tool 100 in an orientation that is "flipped over" relative to the view shown in FIG. 5A (when the latch-assist tool is in the orientation shown in FIG. 2A) with a first end 152 of the cover 150 contacting (and optionally clipping into) a region 144 of the body 104 proximate an end of the light source housing portion 142 (see FIG. 2A). The battery compartment cover 150 may include a clip 154 that secures the cover to a back region 146 of the end 140 and allows a user to easily open and close the battery compartment 136 to replace the battery 138. In other examples, however, the battery compartment may be configured differently (e.g., the battery 138 may slide into the compartment, without requiring the clip 154) and/or may be located in another region of the body 104.

Figure 2C:
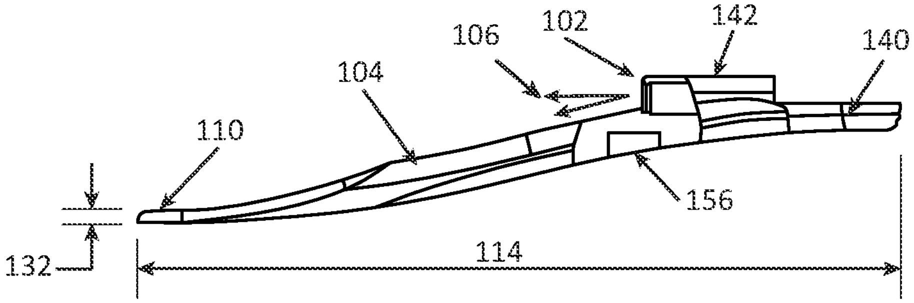
FIG. 2C is a side view of the example of the latch-assist tool of FIGS. 2A and 2B according to aspects of the disclosure.

In the example shown in FIGS. 2A-C, the battery (or batteries) 138 and the power button 108 are accommodated in the body 104 of the latch-assist tool 100. In other examples in which the light source 102 may be attached to the latch-assist tool 100, rather than integrated into the body 104, the power source (e.g., battery or batteries 138) and the power button 108 may be incorporated into a housing of the light source 102.

Figure 3:
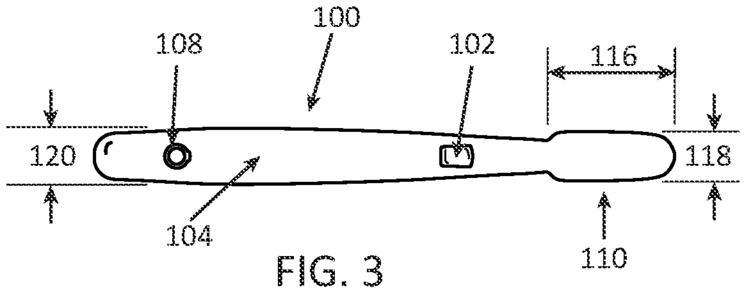
FIG. 3 is a diagram illustrating a top view of another example of a latch-assist tool according to aspects of the disclosure.
Figure 10:
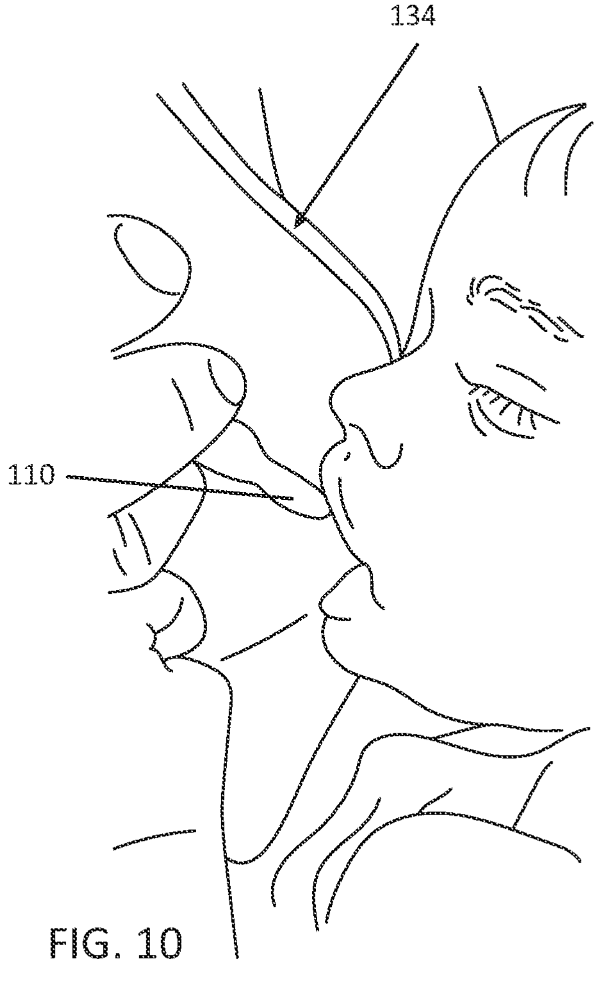
FIG. 10 is diagrams illustrating another example of a mother using an example of a latch-assist tool with a baby, according to aspects of the disclosure.
Figure 11:
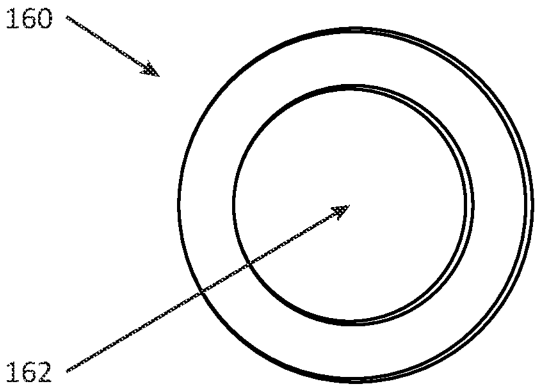
FIG. 11 is a diagram of one example of a magnetic holder in accord with aspects of the disclosure.

According to certain embodiments, the latch-assist tool 100 has a flattened, "spatula-like" tip 110 at one end of the body 104. Examples of the shape of the tip 110 may be seen in FIGS. 1A, 1B, 2A, and 2B, for example. FIG. 3 is a diagrammatic sketch of another example of an embodiment of the latch-assist tool 100 having a different tip shape. The tip 110 may have rounded edges, as shown, and is configured to help flange a baby's lips out for proper latch positioning. In particular, the tip 110 is designed to be more ergonomic to slide under the baby's small lips, compared to a round (and comparatively oversized) finger (see FIG. 10, showing an example of the flattened tip 110 engaging the baby's lips). In certain examples, the body 104 gently narrows from its broadest region near the middle towards the tip 110, as shown in FIGS. 1A, 1B, 2A, and 2B, and the tip 110 flares outwardly from the narrower body at region 112. Thus, in examples, the tip 110 has a "fan" shape, with sides that angle away from the narrow region 112 and rounded end, as shown in FIGS. 1A, 1B, 2A, and 2B. Further, the tip 110 is flattened relative to the body 104, as shown in FIG. 2C, for example.

In addition, as shown in FIGS. 1D and 2C, for example, the body 104 of the latch-assist tool 100 may be gently curved in a "vertical" dimension between the end 140 and the tip 110. The shape may be configured for ease of use and to help the mother use the tip 110 to position the baby's lips using only one hand. In addition, the shape of the body 104 and the light source housing portion 142, and the positioning of the light source 102, may be configured such that the emitted light 106 may be directed towards the baby's mouth and is not blocked or impeded by the tip 110.

Embodiments of the latch-assist tool 100 may be made of a smooth, soft, yet rigid, plastic or silicone material with rounded edges for safety and comfort. In some examples, the latch-assist tool 100 is made of a plastic that does not contain Bisphenol A (referred to as a BPA-free plastic), such as the Tritan™ copolymer offered by Eastman Chemical Company, for example. In certain examples, the latch assist tool 100 may be made by injection molding; however, other manufacturing techniques may be used. In certain examples, the body 104 may have a tapered form, as shown in FIGS. 1A, 1B, 2B, and 3, for example. However, in other examples, the body 104 may have a uniform width. The size of embodiments of the latch-assist tool 100 may be selected with a length sufficient that the mother can easily use the tool with one hand while holding the baby, and the tip 110 may be sized appropriately for an infant's mouth. For example, the latch-assist tool 100 may be roughly the size of a typical pen in certain embodiments. In one example, the latch-assist tool 100 has an end-to-end length 114 in a range of about 5-6 inches (±half an inch). In one example, the length 114 is approximately 5.5 inches (±100 mils). In certain examples, the tip 110 has a tip length 116 in a range of about 0.5-1.5 inches (±0.25 inches) and a tip width 118 in a range of about 0.25-0.75 inches (±200 mils). The tip 110 may have a thickness 132 in a range of about 0.05-0.10 inches (±0.01 inches). In one example, the tip 110 has a tip thickness 132 of approximately 0.08 inches (±20 mils). In certain examples, the body 104 may have a width 120 at its widest point in a range of about 0.25 inches to 1 inch (±200 mils). In certain examples, the maximum width 120 may be slightly more (e.g., ~0.1 inches) than the tip width 118, as shown in FIG. 2A In one example, the width 120 is approximately 0.575 inches (±25 mils).

According to certain embodiments, the latch-assist tool 100 may be configured to "glow" in the dark so that it can be easily found in a dark room or area. In certain examples, the latch-assist tool 100 may be made of a plastic or silicone material that has glow-in-the-dark properties. For example, the latch-assist tool 100 may be made of a material (e.g., plastic or silicone) that includes an embedded luminescent pigment that causes the device to glow in the dark. In certain examples, the entire latch-assist tool 100, or the entire body 104, with or without the tip 110, may be made of the material that glows. In other examples, only one or more regions or features of or on the latch-assist tool 100 may glow. For example, the latch-assist tool 100 may include a logo that glows. Alternatively, or in addition, a certain region of the body 104 may be configured to glow. Alternatively, or in addition, the power button 108 may glow. Various other variations may readily occur to those skilled in the art, given the benefit of this disclosure, and are intended to be covered by examples of the technology disclosed herein.

Figure 4:
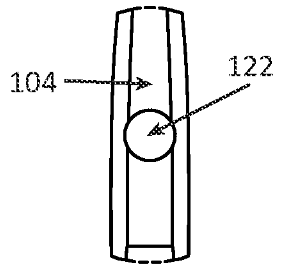
FIG. 4 is a diagram illustrating a portion of an example of a latch-assist tool including a magnetic attachment device, according to aspects of the disclosure.

According to certain embodiments, the latch-assist tool 100 may include a magnet that allows the device to magnetically attach to a holder, either for storage or when in use. FIG. 4 illustrates a portion of an example of the latch-assist tool 100 including a magnet 122 positioned in or on the body 104. In one example, the magnet 122 may be embedded in the body 104, or housed inside the body 104 (e.g., in a magnet compartment 156, as shown in FIG. 2C) such that the back side (i.e., the side opposite the side having the power button 108) of at least a portion of the body 104 can magnetically attach to another magnet or a magnetic surface. The magnet 122 may include a single magnet or multiple magnets, and need not be round as shown in FIG. 4. In the example shown in FIG. 2C, the magnet 122 is positioned in the body 104 near the end 140 away from the tip 110; however, in other examples, the magnet 122 may be positioned elsewhere in or on the body 104. Various examples of a holder are described below with reference to FIGS. 7, 8A, 8B, 11, and 12.

Figure 7A:
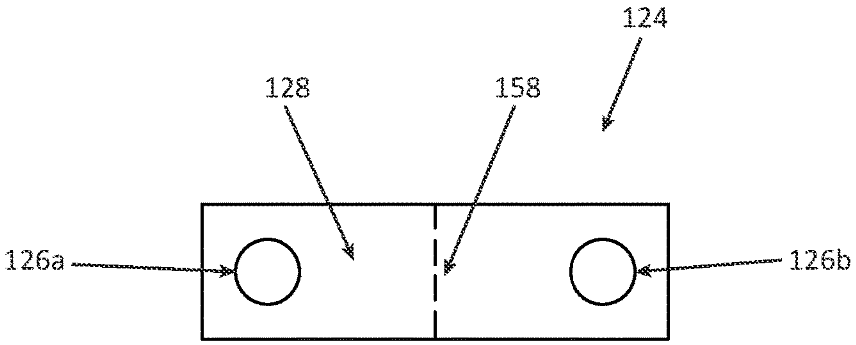
FIG. 7A is a diagram illustrating one example of a magnetic holder that may be used with embodiments of a latch-assist tool according to aspects of the disclosure.

Referring to FIG. 7A, there is illustrated an example of a magnetic holder 124 that may be used with the latch-assist tool 100. In this example, the magnetic holder 124 includes a pair of magnets 126*a*, 126*b*, attached to or embedded in a housing 128. In one example, the housing 128 is made of silicone. In another example, the housing 128 is made of a thin strip of cloth. In other examples, the housing 128 may be made of other materials, such as plastic. Each of the magnets 126*a*, 126*b* may be single magnets of made up of multiple magnets.

According to certain embodiments, the magnetic holder 124 may be configured to "glow" in the dark so that it can be easily found in a dark room or area. In certain examples, the magnetic holder 124 may be made of a luminescent material, such as a material that includes a pigment that that has glow-in-the-dark properties, for example. In certain examples, the entire magnetic holder 124 may be made of the luminescent material. In other examples, only one or more regions or features of or on magnetic holder 124 may glow. For example, the magnetic holder 124 may include a logo that glows. Alternatively, or in addition, a certain region of the magnetic holder 124 may be configured to glow. Various other variations may readily occur to those skilled in the art, given the benefit of this disclosure, and are intended to be covered by examples of the technology disclosed herein.

Figure 8A:
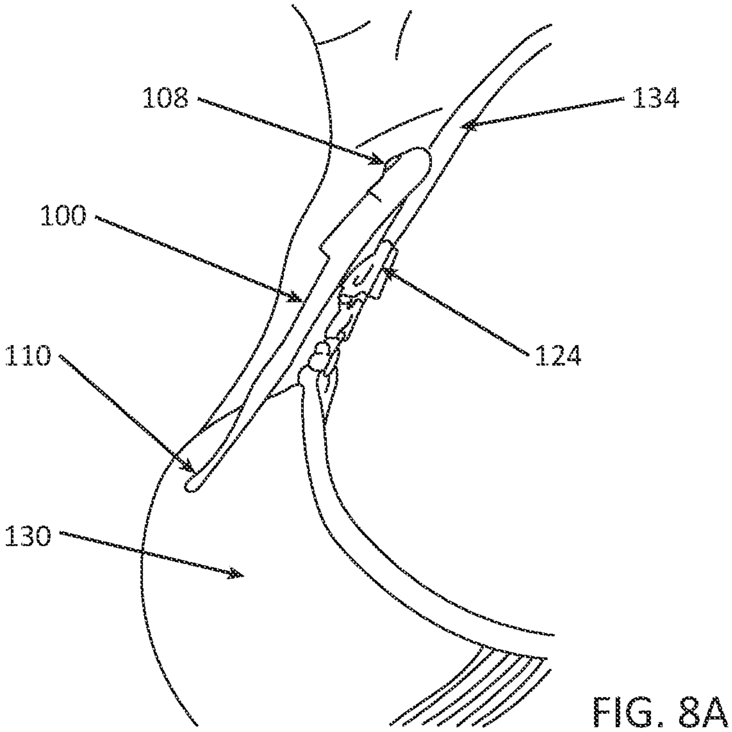
FIG. 8A is a diagram illustrating an example of latch-assist tool attached to an item of clothing via a magnetic holder, in accord with aspects of the disclosure.
Figure 8B:
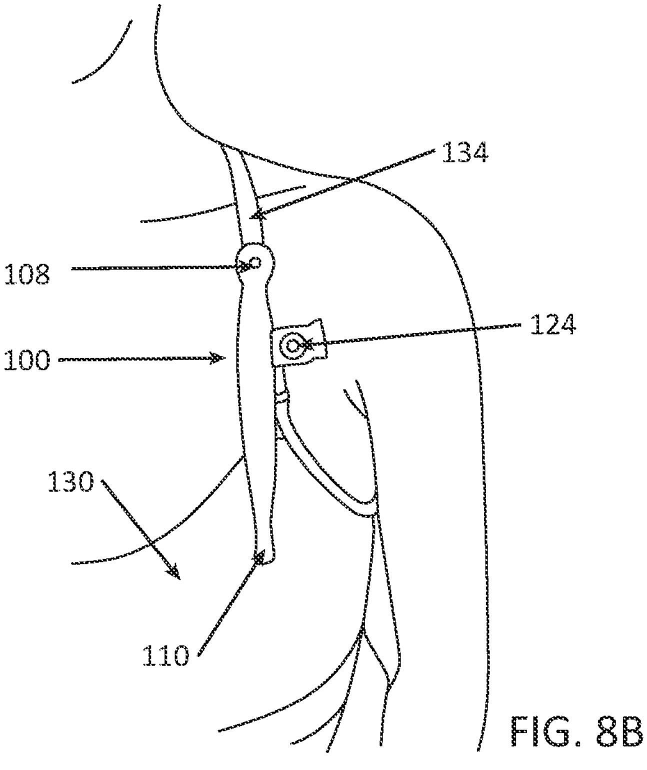
FIG. 8B is a diagram illustrating another example of a latch-assist tool attached to an item of clothing via a magnetic holder, in accord with aspects of the disclosure.

Referring to FIGS. 7A, 8A and 8B, according to certain embodiments, the magnetic holder 124 may be fastened onto an item of clothing 130, such as a top (as shown) or bra, for example. In FIG. 8B, the latch-assist tool 100 is depicted slightly away from the magnetic holder 124 so as to show more clearly the magnetic holder 124 attached to the item of clothing 130. The attachment may be achieved by folding the housing 128 (as indicated by dotted line 158 in FIG. 4) around a strap 134, or other piece/region, of the item of clothing 130, and allowing the pair of magnets 126*a*, 126*b*, to engage one another to "clip" or "snap" the housing 128 together and secure it to the item of clothing 130. The latch-assist tool 100 may be magnetically attached to one or both of the magnets 126*a*, 126*b* by its magnet 122, as shown in FIG. 8A Thus, the latch-assist tool 100 can be easily and quickly attached to (and detached from) the magnetic holder 124, where it may be conveniently held in place and the emitted light 106 directed towards the baby's mouth without the mother having to hold the latch-assist tool 100 in her hand. For lighting, the latch-assist tool 100 may therefore be used 'hands-free" by the mother.

Figure 7B:
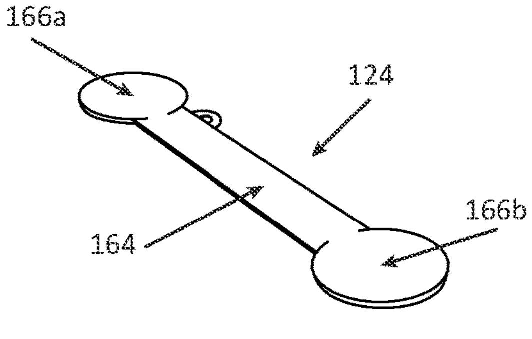
FIG. 7B is a diagram illustrating another example of a magnetic holder that may be used with embodiments of a latch-assist tool according to aspects of the disclosure.

FIG. 7B illustrates another example of the magnetic holder 124. In this example, the magnetic holder 124 includes a body region 164 and two end regions 166*a*, 166*b*. One or both of the end regions 166*a*, 166*b* may accommodate one or more magnets, as discussed above with reference to FIG. 7A. Thus, the magnetic holder 124 can be attached to an item of clothing, for example, by folding the body region 164 around a strap 134 or other piece/region, of the item of clothing 130, as discussed above, and allowing magnets housed in the end regions 166*a*, 166*b*, to engage one another to clip or snap the end regions together and thus secure the magnetic holder 124 in place. The latch-assist tool 100 may be magnetically attached to a magnet in at least one of the end regions 166*a*, 166*b* by its magnet 122, as discussed above. In examples, the magnetic holder 124 of FIG. 7B may be made of silicone, plastic, or another material.

Figure 9:
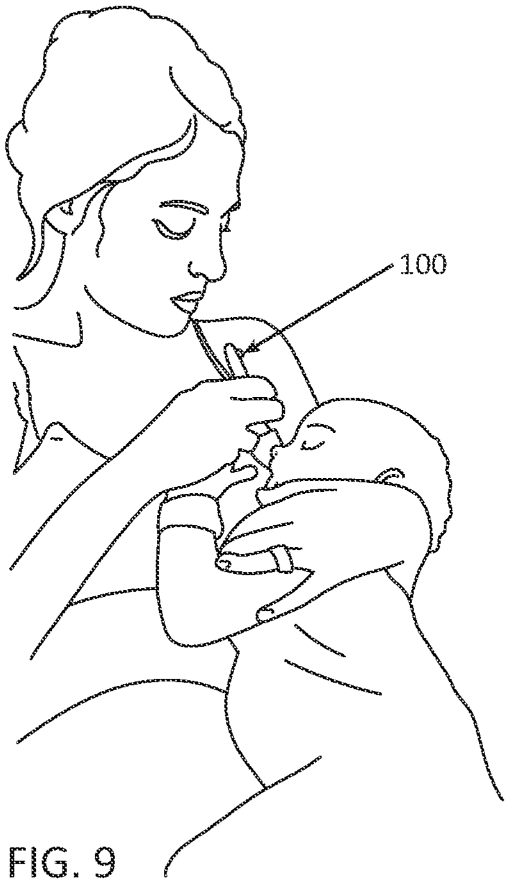
FIG. 9 is a diagram illustrating an example of a mother using an example of a latch-assist tool with a baby, according to aspects of the disclosure.

FIGS. 9 and 10 show an example of a mother using the latch-assist tool 100 to flange open the baby's lips, after which the latch-assist tool can be quickly and easily attached to the mother's clothing 130, as discussed above, to continue to provide light (should the mother need it). The magnetic holder 124 may be positioned on the item of clothing 130 so that the mother can easily reach the power button 108 to activate or deactivate the light source 102, as needed, as shown in FIGS. 8A, 8B, and 9, for example.

Although some examples of the magnetic holder 124 shown in FIGS. 7A and 7B use the magnets 126*a*, 126*b* for attachment to the item of clothing 130 as well as for attaching the latch-assist tool 100, those skilled in the art will appreciate (given the benefit of this disclosure) that other configurations may be used. For example, the magnetic holder 124 may use other fasteners, such as snap fasteners, buttons, or hook-and-loop fasteners, for attachment to the item of clothing 130, and may include one or more embedded or attached magnets for attaching the latch-assist tool 100. For example, in the embodiment of FIG. 7B, the end regions 166*a*, 166*b* may include fasteners, such as buttons, snaps, hook-and-loop fasteners, for example, to allow the end regions to be secured together.

For best breastfeeding results, it is generally preferably that a mother alternate feeding the infant from one breast and then the other. At times, it may be difficult for the mother to remember which breast she last used for feeding and therefore which breast should be used first in the current feeding. Advantageously, because the magnetic holder 124 may be attached to the item of clothing 130 on a side or region corresponding to the current breast being used for feeding, its placement may serve as a reminder for which breast was last used in the previous feeding session. Accordingly, the magnetic holder 124 may serve a dual purpose, as both a reminder device and a holder for the latch-assist tool 100.

Figure 12:
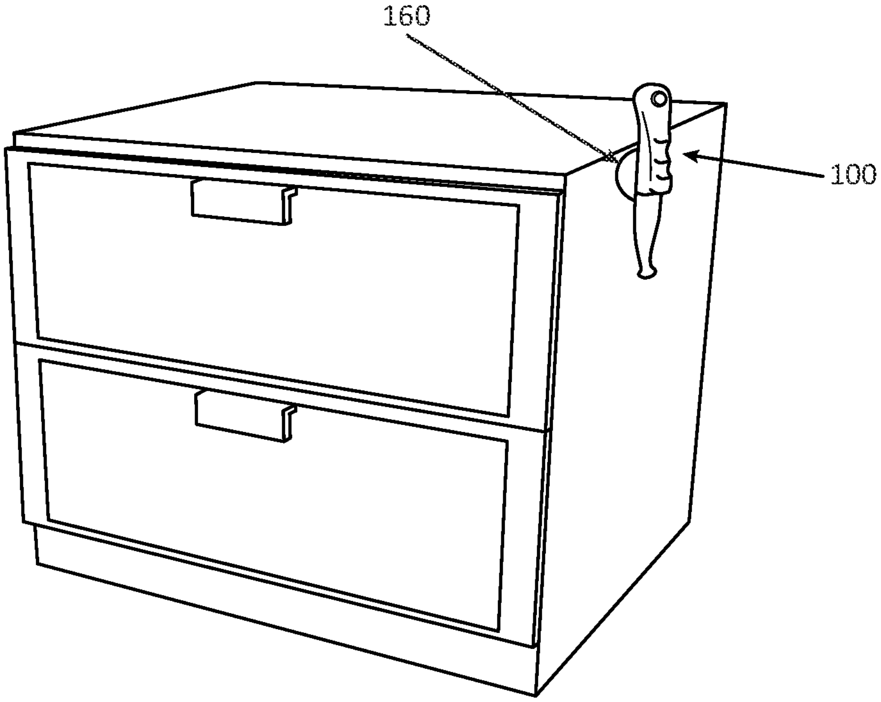
FIG. 12 is a diagram illustrating an example of a latch-assist tool attached to a piece of furniture via a magnetic holder, in accord with aspects of the disclosure.

According to further embodiments, in some examples, a magnetic storage device can be used for conveniently storing the latch-assist tool in a readily-accessible location when it is not in use. For example, referring to FIG. 11 there is illustrated an example of a magnetic storage device 160. The magnetic storage device 160 includes a surface 162 that covers one or more magnets (not shown). The magnet 122 in the latch-assist tool 100 may engage the magnet(s) in the magnetic storage device 160 to removably attach the latch-assist tool 100 to the magnetic storage device 160. The magnetic storage device 160 may be attached (e.g., using a clip, hook-and-loop fasteners, a removable adhesive, a magnetic attachment, or other attachment mechanism) to a piece of furniture (e.g., a night-stand, crib, chair, etc.) as shown in FIG. 12. The latch-assist tool 100 may then be attached to the magnetic storage device 160 when not in use so that it is conveniently stored and does not get lost, while also being readily accessible when needed. In examples, the magnetic storage device 160 is a made of plastic and includes one or more embedded magnets. In the example shown in FIG. 11, the magnetic storage device 160 is round; however, in other examples it may have other shapes. In some examples, the magnetic storage device 160 may be configured to glow in the dark so that it can be easily found in a dark room or area. In certain examples, the magnetic storage device 160 may be made of a luminescent material, such as a material that includes a pigment that that has glow-in-the-dark properties, for example. In certain examples, the entire magnetic storage device 160 may be made of the luminescent material. In other examples, only one or more regions or features of or on the magnetic storage device 160 may glow. For example, the magnetic storage device 160 may include a logo that glows. Alternatively, or in addition, a certain region of the magnetic storage device 160, such as the surface 162, for example, may be configured to glow. Various other variations may readily occur to those skilled in the art, given the benefit of this disclosure, and are intended to be covered by examples of the technology disclosed herein.

Thus, aspects and embodiments provide a latch-assist tool that solves several problems that may be encountered during breast- and/or bottle-feeding, and addresses several existing needs. For example, as discussed above, embodiments of the latch-assist tool 100 may address the need for having a good light set-up in a dark room and/or at night when trying to feed an infant without waking up other individuals in the room, including the infants themselves, and without the disruption normal bright lights can cause to the mother's sleep cycle and ability to return to sleep after feeding. Embodiments of the latch-assist tool 100 may further address the need for a directed light specifically shined onto the baby's mouth to check for proper latching, and the need for a light that is hands-free. In addition, embodiments of the latch-assist tool 100 may address the need for a thin/shallow device to help flange the baby's lips during the latching process, as discussed above. Furthermore, embodiments of the magnetic holder 124 may provide a good reminder system to signal which breast was last used during the prior breastfeeding session, as also discussed above. In addition, a magnetic storage device 160 can be used to conveniently store the latch-assist tool 100 when it is not is use. Aspects and embodiments thus provide a unique and useful device to assist with breastfeeding, including a light pared with a spatula tool, optionally in combination with a breastfeeding reminder clip.

Having described above several aspects of at least one embodiment, it is to be appreciated various alterations, modifications, and improvements will readily occur to those skilled in the art. Such alterations, modifications, and improvements are intended to be part of this disclosure. It is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only.

What is claimed is:

1. A wearable latch-assist tool comprising:

an elongate body made of a BPA-free plastic and having a flattened tip at one end, the tip being configured to open an infant's lips and also adjust positioning of the infant's lips for latching to assist in breastfeeding or bottle-feeding the infant, wherein the flattened tip is thinner than the body;

a light source accommodated in the body and configured to emit a low-intensity light comprising an amber or red wavelength;

a power source accommodated in the body, the power source configured to supply operating power to the light source;

a power button accommodated in the body and electrically connected to the power source, the power button being configured to activate and deactivate the light source; and an attachment mechanism coupled to the elongate body and positioned away from the tip, the attachment mechanism configured to attach the wearable latch-assist tool to an item of clothing.

2. The wearable latch-assist tool of claim 1, wherein the light source is a light emitting diode (LED) light source.

3. The wearable latch-assist tool of claim 2, wherein the light source is a blue-reducing LED light source that emits the light having a color temperature in a range of 2700-3300 Kelvin.

4. The wearable latch-assist tool of claim 1, wherein the power button is positioned proximate an opposite end of the body relative to the tip.

5. The wearable latch-assist tool of claim 1, wherein the power source is a rechargeable battery.

6. The wearable latch-assist tool of claim 1, wherein the attachment mechanism includes a magnet accommodated in the body.

7. The wearable latch-assist tool of claim 6, wherein the magnet is positioned proximate the power button on an opposing side of the body from the power button.

8. The wearable latch-assist tool of claim 1, wherein the tip has the form of a spatula.

9. The wearable latch-assist tool of claim 1, wherein the body includes a luminescent pigment.

10. The wearable latch-assist tool of claim 1, wherein the tip is made of silicone.

11. A latch-assist kit comprising:

a latch-assist tool including a body having a flattened, rounded tip at one end, the body being made of a BPA-free plastic and the tip configured to open and adjust positioning of an infant's lips for latching to assist in breastfeeding or bottle-feeding the infant, the flattened tip being thinner than the body, a light source accommodated in the body and positioned between the tip and an opposite end of the body, the light source configured to emit a low-intensity light towards the tip, the light comprising an amber or red wavelength;

a battery accommodated in the body and configured to supply operating power to the light source, and a power button accommodated in the body and electrically connected to the battery, the power button being configured to activate and deactivate the light source, and a magnet accommodated in the body; and a magnetic holder configured to be attached to an item of clothing and including at least one holder magnet, wherein the latch-assist tool is configured to be magnetically attached to the magnetic holder via magnetic engagement between the magnet and the at least one holder magnet.

12. The latch-assist kit of claim 11, wherein the magnetic holder comprises a silicone material, the holder magnet being embedded in the silicone material.

13. The latch-assist kit of claim 11, wherein the magnetic holder includes a mating pair of fasteners to attach the magnetic holder to the item of clothing.

14. The latch-assist kit of claim 11, wherein the magnetic holder includes a luminescent pigment.

15. The latch-assist kit of claim 11, wherein the body includes a luminescent pigment.

16. The latch-assist kit of claim 11, further comprising:

a magnetic storage device including a housing and at least one storage magnet accommodated in the housing, wherein the latch-assist tool is configured to be magnetically attached to the magnetic storage device via magnetic engagement between the magnet and the at least one storage magnet.

17. The latch-assist kit of claim 16, wherein the housing of the magnetic storage device includes a luminescent pigment.

18. The latch-assist kit of claim 11, wherein the light source is a blue-reducing light emitting diode (LED) light source that emits the light having a color temperature in a range of 2700-3300 Kelvin.

19. A wearable latch-assist tool for use in assisting breastfeeding or bottle-feeding of an infant, the wearable latch-assist tool comprising:

a body having a flattened tip and an opposing end, the body being made of at least one of a BPA-free plastic or silicone, and the body including a luminescent pigment, wherein the flattened tip is thinner than the body and is configured to open and adjust positioning the infant's lips for latching to assist in breastfeeding or bottle-feeding the infant;

a light source accommodated in the body and positioned along a length of the body between the tip and the opposing end of the body, the light source configured to emit a low-intensity light towards the tip, the light comprising an amber or red wavelength;

at least one battery accommodated in the body and configured to supply operating power to the light source;

a power button accommodated in the body and electrically connected to the at least one battery, the power button being configured to activate and deactivate the light source; and an attachment mechanism coupled to the body and positioned away from the tip, the attachment mechanism configured to attach the wearable latch-assist tool to an item of clothing.

20. The latch-assist tool of claim 19, wherein the battery is a rechargeable battery.

* * * * *